United States Patent
Charbonneau et al.

(10) Patent No.: US 7,452,186 B2
(45) Date of Patent: Nov. 18, 2008

(54) TURBINE BLADE INCLUDING REVISED TRAILING EDGE COOLING

(75) Inventors: Robert A. Charbonneau, Meriden, CT (US); Kenneth P. Botticello, West Suffield, CT (US); Shawn J. Gregg, Wethersfield, CT (US); Kirk David Hlavaty, East Hartford, CT (US); Jeffrey R. Levine, Wallingford, CT (US); Kenneth A. Lonczak, Meriden, CT (US); Craig R. McGarrah, Southington, CT (US); Dominic J. Mongillo, West Hartford, CT (US); Lisa P. O'Neill, Manchester, CT (US); Edward Pietraszkiewicz, Southington, CT (US); Richard M. Salzillo, Plantsville, CT (US); Heather Ann Terry, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 570 days.

(21) Appl. No.: 11/205,299

(22) Filed: Aug. 16, 2005

(65) Prior Publication Data

US 2007/0041835 A1    Feb. 22, 2007

(51) Int. Cl.
  *F01D 5/18*    (2006.01)

(52) U.S. Cl. .................................................. 416/97 R
(58) Field of Classification Search ................ 416/97 R
  See application file for complete search history.

(56) References Cited

U.S. PATENT DOCUMENTS

| 5,337,805 | A | * | 8/1994 | Green et al. ................. 164/369 |
| 5,378,108 | A | * | 1/1995 | Zelesky ..................... 416/97 R |
| 6,139,269 | A | * | 10/2000 | Liang ........................ 416/97 R |
| 6,234,754 | B1 | * | 5/2001 | Zelesky et al. ............ 416/97 R |
| 7,008,186 | B2 | * | 3/2006 | Heeg et al. ................. 416/97 R |

* cited by examiner

*Primary Examiner*—Richard Edgar
(74) *Attorney, Agent, or Firm*—Carlson, Gaskey & Olds

(57) ABSTRACT

The present invention provides an improved cooling circuit for a trailing edge of a turbine blade. The cooling circuit includes an inlet passage that receives a airflow and distributes the airflow through a feed passage. The feed passage primarily includes trip strips, at least one barrier including cross-over holes, teardrop shaped protrusions, and pockets disposed along a trailing edge. The geometry and positioning of both the cross-over holes and teardrop shaped protrusions downstream of the cross-over holes have been optimized to maximize cooling efficiency and reduce airflow. An improved transition between the inlet passage and the feed passage is also provided, which is arcuate and allows the airflow to maintain attachment and flow unimpeded from the inlet passage to the feed passage. The geometry of the pockets disposed along the trailing edge is optimized to improve cooling.

25 Claims, 8 Drawing Sheets

TURBINE BLADE INCLUDING REVISED TRAILING EDGE COOLING

BACKGROUND OF THE INVENTION

This application relates generally to gas turbine engines and more specifically to a cooled turbine blade having a trailing edge cooling circuit with several unique features.

Conventional gas turbine engines include a compressor, a combustor and a turbine assembly that has a plurality of adjacent turbine blades disposed about a circumference of a turbine rotor. Each turbine blade typically includes a root that attaches to the rotor, a platform and an airfoil that extends radially outwardly from the rotor.

The compressor receives intake air. The intake air is compressed by the compressor and delivered primarily to the combustor where the compressed air and fuel are mixed and burned. A portion of the compressed air is bled from the compressor and fed to the turbine to cool the turbine blades.

The turbine blades are used to provide power in turbo machines by exerting a torque on a shaft that is rotating at a high speed. As such, the turbine blades are subjected to myriad mechanical stress factors. Further, because the turbine blades are located downstream of the combustor where fuel and air are mixed and burned, they are required to operate in an extremely harsh environment.

Hot burnt fuel-air mixture is expelled from the combustor and travels downstream to the turbine assembly, including the plurality of turbine blades. Each individual turbine blade includes a leading edge and a trailing edge, a pressure side and a suction side. The leading edge extends upwardly from the platform along the airfoil and is the first edge to contact the hot burnt fuel-air mixture as it travels through the turbine assembly. The trailing edge is substantially parallel to the leading edge and is located downstream of the leading edge. The pressure side is a concave surface that extends between the leading edge and the trailing edge. The pressure side directs the hot burnt fuel-air mixture along the turbine blade toward the trailing edge. The suction side is a convex surface, adjacent to the pressure side. The suction side also extends from the leading edge to the trailing edge. Various internal cooling circuits are disposed between the pressure side and the suction side.

As the hot burnt fuel-air mixture travels past the leading edge, along the pressure side, and past the trailing edge, a temperature associated with the individual turbine blades increases resulting in increased stress within the turbine blade. A cooling fluid, e.g. an airflow, is delivered to each individual turbine blade via the various internal cooling circuits sandwiched between the pressure side and the suction side of the turbine blade. The cooling circuits direct cooler compressed air bled from the compressor up through the root of the turbine blade and throughout the airfoil to cool the turbine blade.

One known cooling circuit technique directs airflow from the root radially outwardly toward the trailing edge. This cooling circuit receives an airflow from an opening disposed in the root of the turbine blade and feeds the airflow from an inlet passage radially outwardly through a feed passage. A known transition from the inlet passage to the feed passage includes a sharp corner that inhibits airflow from the inlet passage to a lower portion the feed passage. This may create a hot spot, i.e. an area of higher stress, within the turbine blade.

One known feed passage includes at least one barrier extending a length of the feed passage and a plurality of cross-over holes disposed along the length of the barrier. Known cross-over holes direct the airflow toward both a plurality of teardrop shaped protrusions downstream of the barrier and a plurality of openings disposed between each of the teardrop shaped protrusions. The plurality of teardrop shaped protrusions are disposed along the trailing edge of the turbine blade and direct airflow upward along the trailing edge and out of the turbine blade.

Known barriers includes cross-over holes of varying size. A width between adjacent cross-over holes also varies along the length of the barrier. This variation in size and position of the cross-over holes can cause a non-uniform airflow through the feed passage. This may result in additional hot spots, i.e. areas of higher stress, within the turbine blade. Further, known positioning of the cross-over holes in relation to the teardrop shaped protrusions may also have a detrimental effect on the cooling efficiency of the airflow.

As such, it is desirable to provide a turbine blade including a trailing edge cooling circuit that is optimized to reduce the effects of the mechanical stress factors, improve air flow throughout the airfoil and maximize cooling efficiency.

SUMMARY OF THE INVENTION

The present invention provides an improved trailing edge cooling circuit for a turbine blade. The cooling circuit primarily includes an inlet passage that receives and distributes an airflow along a trailing edge via a feed passage. The feed passage includes trips strips, at least one barrier including cross-over holes, i.e. openings within the barrier that direct airflow through the barrier, teardrop shaped protrusions, and pockets disposed along the trailing edge.

In the present invention, the improved cooling circuit includes an inlet passage, which receives an airflow from an opening within the root, and a feed passage, which receives the airflow from the inlet passage and directs the airflow through the turbine blade. The airflow exits through pockets disposed along the trailing edge of the turbine blade.

The feed passage includes at least one barrier with cross-over holes optimized to maximize cooling efficiency and reduce an airflow. Further, the geometry and positioning of both the cross-over holes and teardrop shaped protrusions downstream of the cross-over holes have been optimized to maximize cooling efficiency and reduce airflow.

An improved transition between the inlet passage and the feed passage is also provided. The improved transition is arcuate, allowing the airflow to maintain attachment to an inside wall of the cooling circuit and flow unimpeded from the inlet passage to the feed passage. This prevents airflow starvation within a lower portion of the feed cavity and the trailing edge.

Finally, the geometry of the pockets disposed along the trailing edge has been optimized to improve cooling.

These and other features of the present invention can be best understood from the following specification and drawings, the following of which is a brief description.

DETAILED DESCRIPTION OF THE PREFERRED EMBODIMENT

Figure 1:
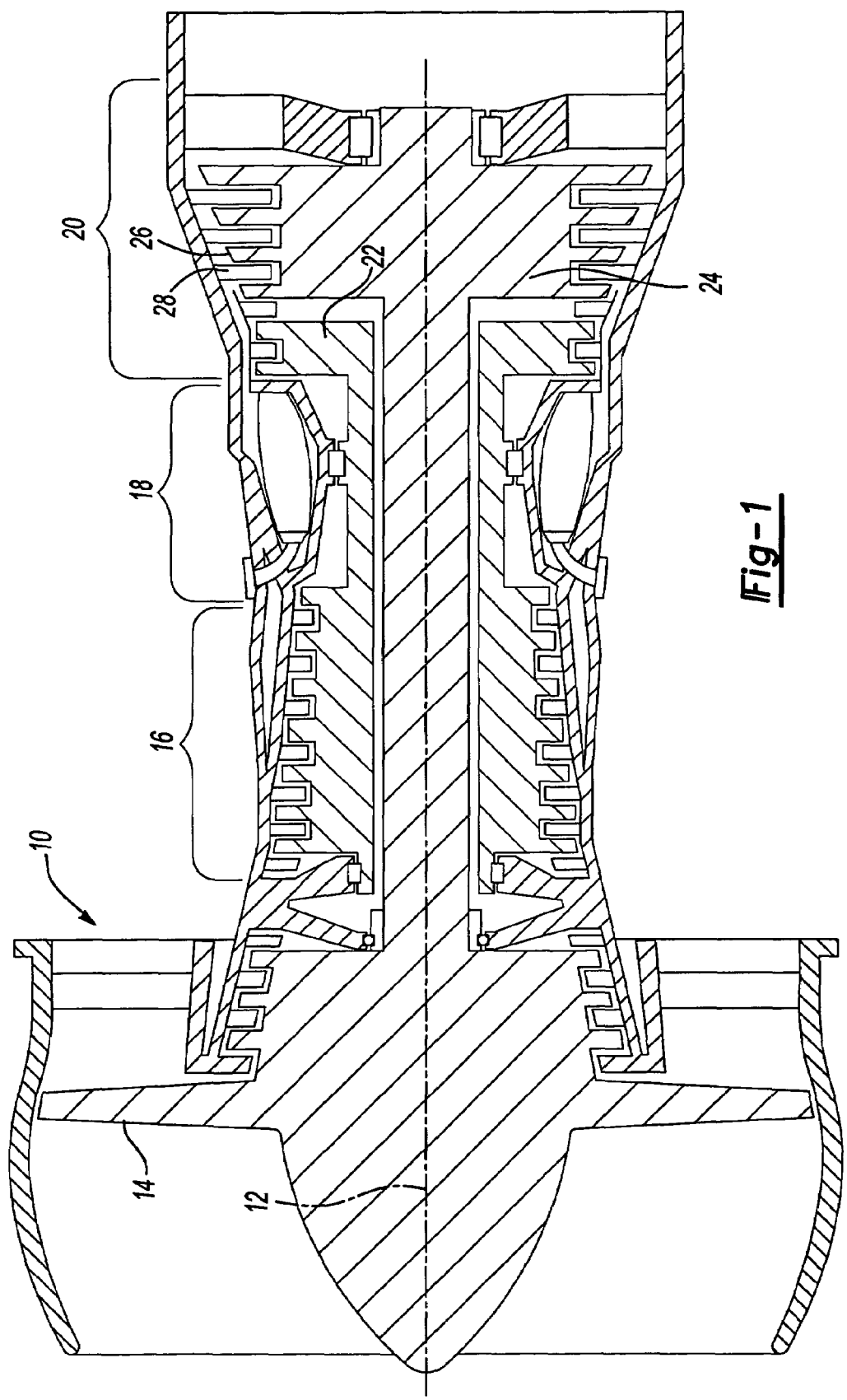
FIG. 1 is a schematic illustration of an example gas turbine engine.

FIG. 1 is a schematic illustration of an example gas turbine engine 10 circumferentially disposed about an engine centerline, or axial centerline axis 12. The example gas turbine engine 10 includes a fan 14, a compressor 16, a combustor 18, and a turbine assembly 20. As is known, intake air from the fan 14 is compressed in the compressor 16. The compressed air is mixed with fuel and burned in the combustor 18 and expanded in the turbine assembly 20. The turbine assembly 20 includes rotors 22 and 24 that, in response to the expansion, rotate, driving the compressor 16 and the fan 14. The turbine assembly 20 includes alternating rows of rotary blades 26 and static airfoils or vanes 28, which are mounted to the rotors 22 and 24. The example gas turbine engine 10 may, for example, be a gas turbine used for power generation or propulsion. However, this is not a limitation on the present invention, which may be employed on gas turbines used for electrical power generation, in aircraft, etc.

Figure 2:
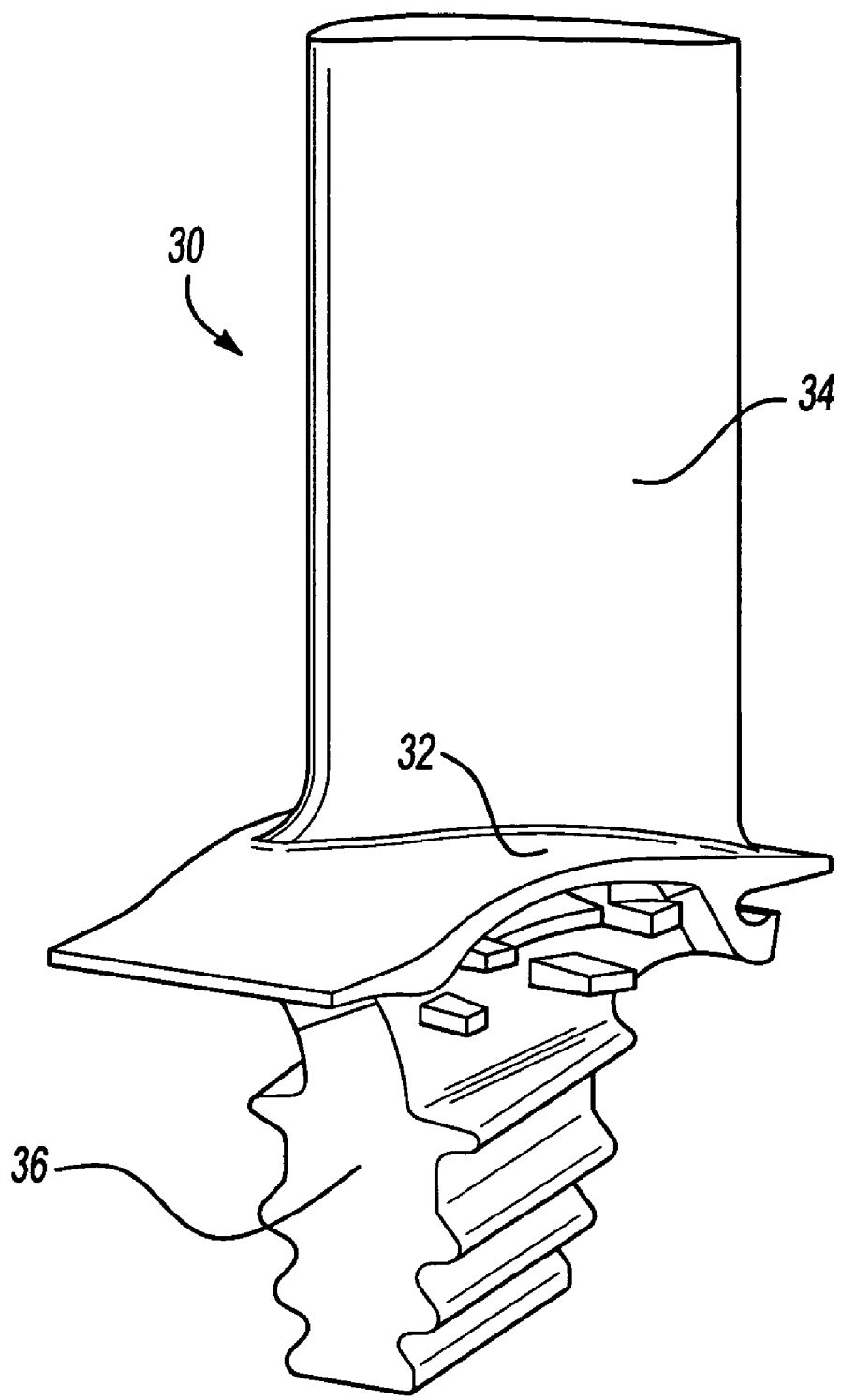
FIG. 2 illustrates an example turbine blade.

FIG. 2 illustrates an example turbine blade 30 having a platform 32, with an airfoil 34 extending upward from the platform 32 and a root 36 extending below the platform 32. While the present invention is being illustrated in a turbine blade, it should be understood that the invention would also be beneficial in a static structure such as a stator or a vane 28. Further, while the inventive turbine blade 30 is designed for use in a first stage turbine assembly, the inventive turbine blade 30 may be used in any stage.

Figure 3:
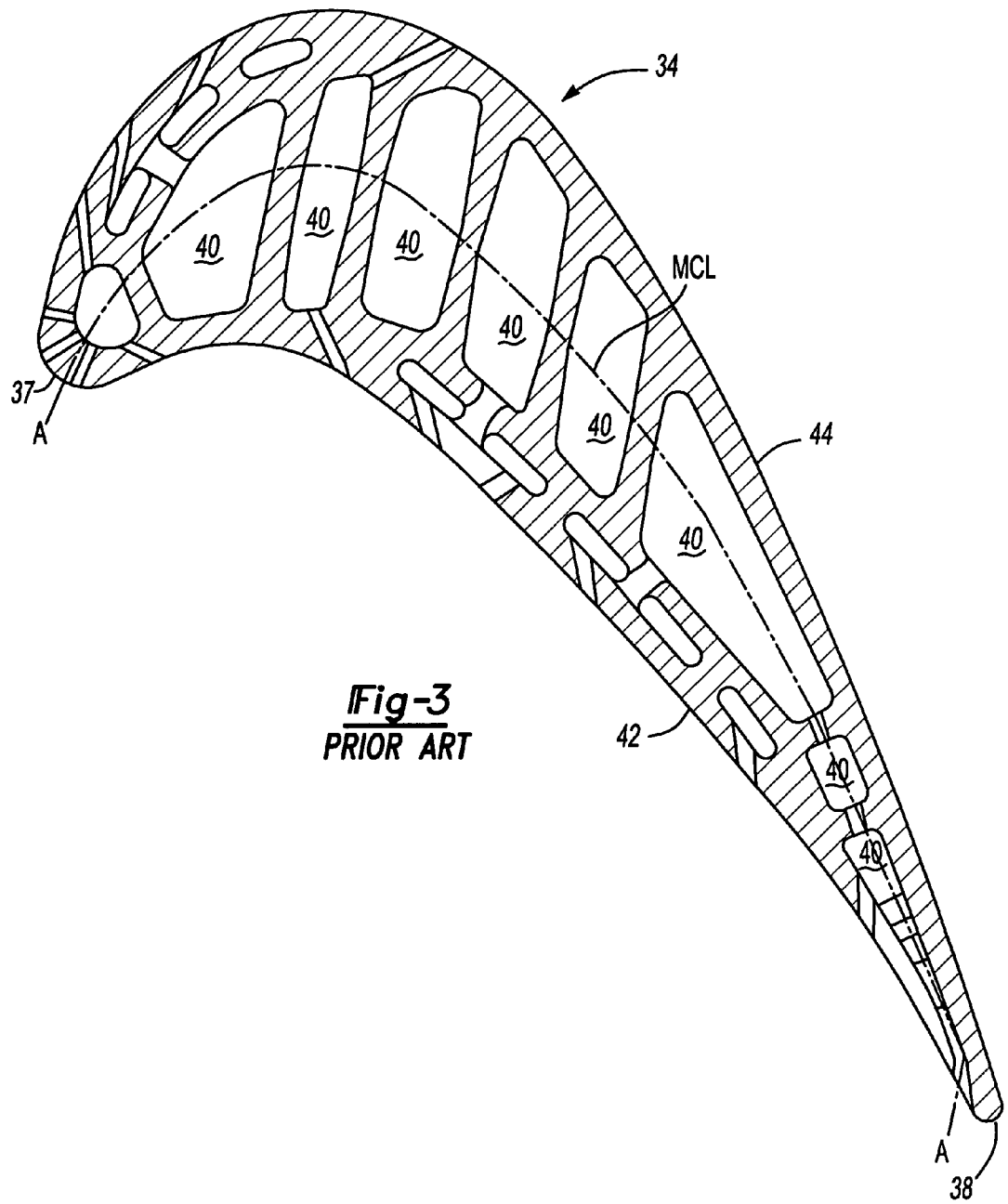
FIG. 3 is a schematic illustration of a prior art airfoil.

FIG. 3 is a schematic overview illustration of a prior art airfoil 34. The airfoil 34 includes a leading edge 37 and a trailing edge 38. Cooling circuits 40 are provided through the airfoil 34. The cooling circuits 40 receive an airflow from an air supply adjacent the platform 32 and direct the airflow radially outwardly through the airfoil 34.

The airfoil 34 includes a pressure side 42 and a suction side 44. A mean camber line MCL extends the length of the airfoil 34, chordwisely from the leading edge 37 to the trailing edge 38 at a location midway between the pressure side 42 and the suction side 44.

Figure 4:
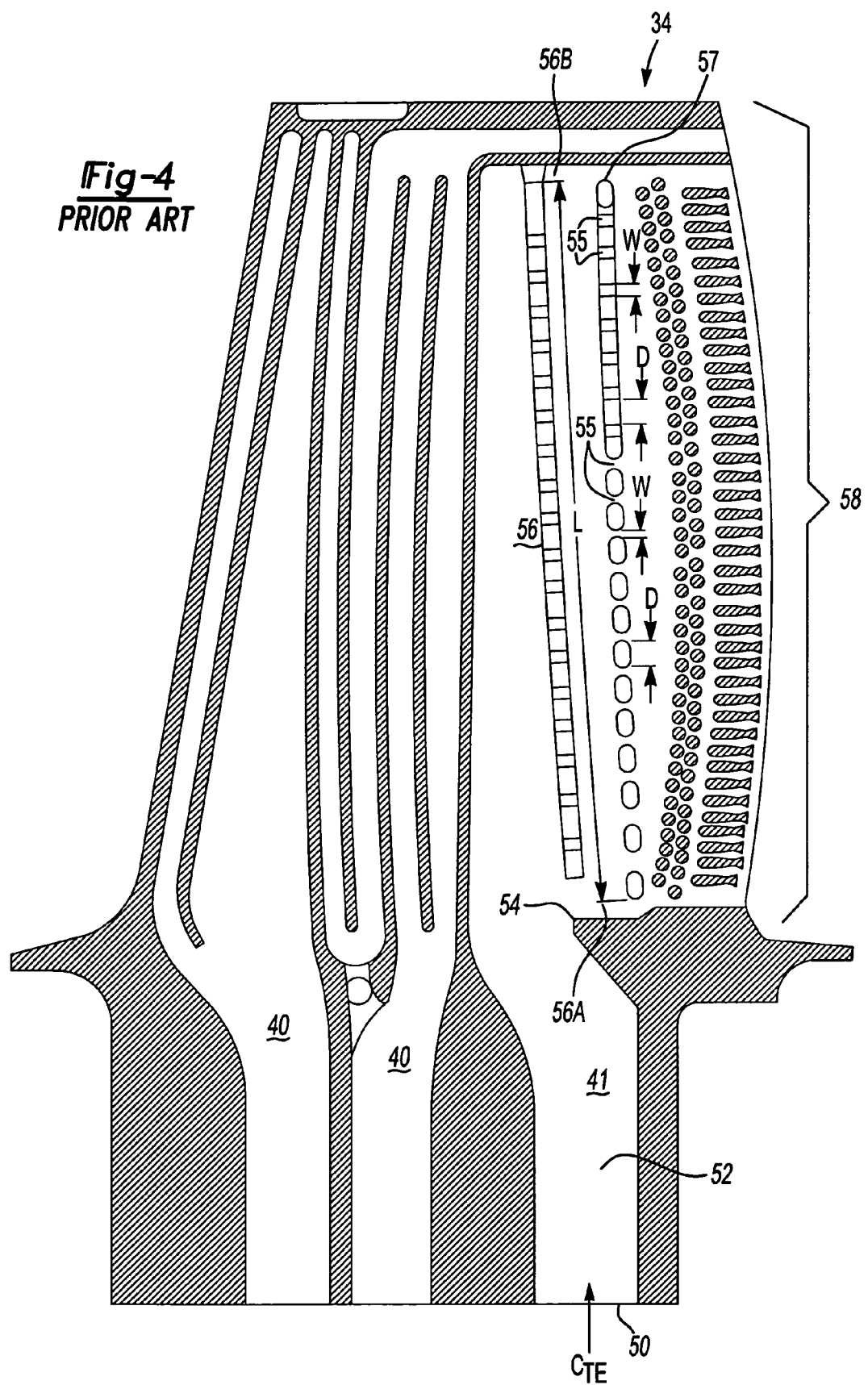
FIG. 4 is a sectional view of a prior art airfoil illustrating example cooling circuits.

FIG. 4 is a sectional view of the prior art airfoil 34 through the Section A-A shown in FIG. 3 along the MCL. A series of cooling circuits 40 and a trailing edge cooling circuit 41 are illustrated. A cooling fluid, typically an airflow, $C_{TE}$ enters the trailing edge cooling circuit 41 through an inlet opening 50 and flows into an inlet passage 52. The airflow $C_{TE}$ from the inlet passage 52 attempts to flow around a transition 54 into a feed passage 56. However, because the transition 54 is relatively sharp and angled towards the leading edge, much of the airflow $C_{TE}$ maybe directed upwardly into an upper portion 56B of the feed passage 56 to then exit the airfoil 34 through a trailing edge 58. As such, a lower portion 56A of the feed passage 56 can become starved of sufficient airflow resulting in hot spots and additional stress near the transition 54.

A plurality of known cross-over holes 55 are also schematically illustrated along a barrier 57 in FIG. 4. A width W of each of the known cross-over holes 55 can vary along a length L of the barrier 57. Further, a distance D between adjacent known cross-over holes 55 can also vary along the length L of the barrier 57. The varying width W of each of the known cross-over holes 55 and the varying position of each the known cross-over holes 55 in relation to one another may result in a non-uniform flow of air through the barrier 57 resulting in uneven cooling along the trailing edge 58.

Figure 5:
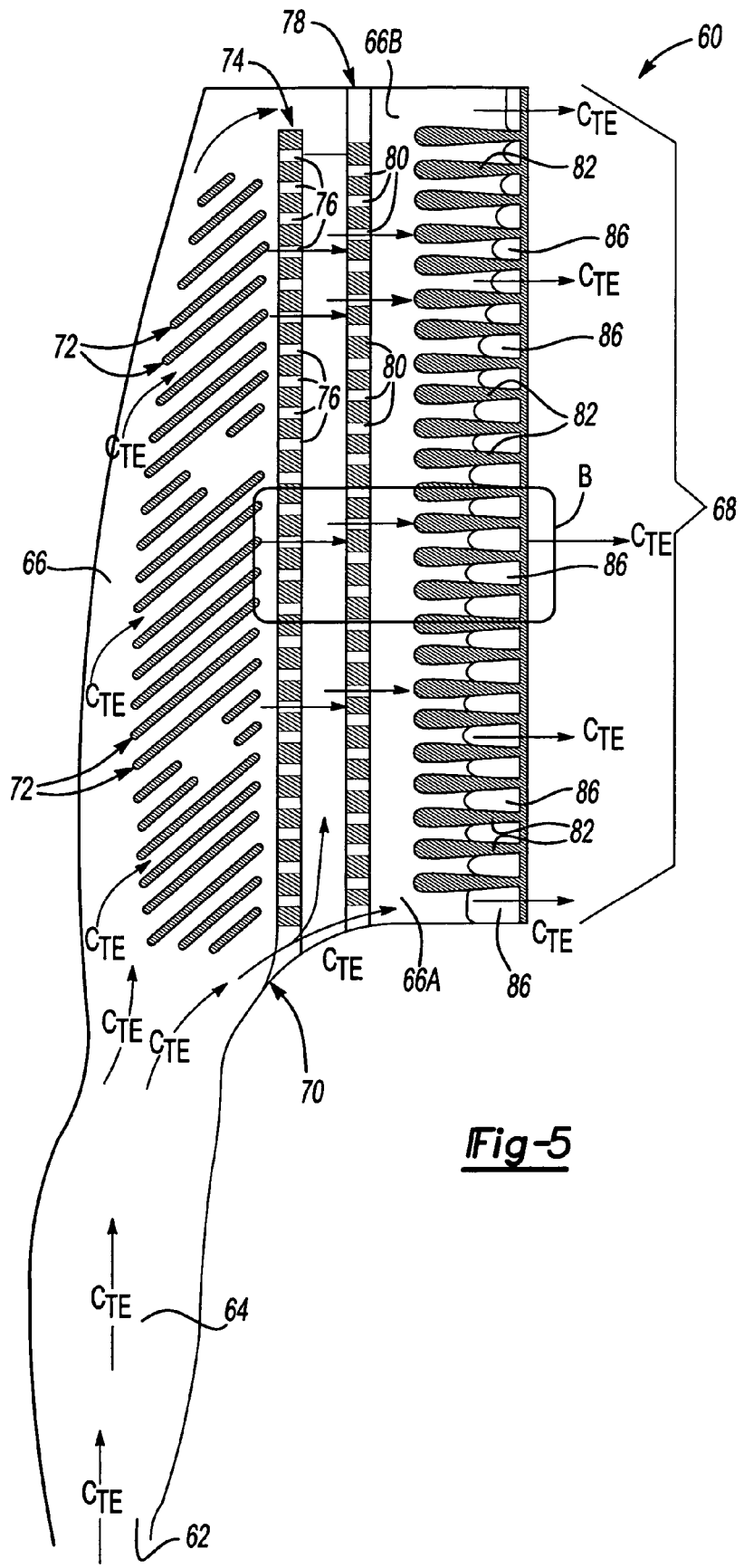
FIG. 5 is a sectional view of a trailing edge cooling circuit according to one embodiment of the present invention.

FIG. 5 is a sectional view of a trailing edge cooling circuit 60 according to one embodiment of the present invention. A cooling fluid, typically an airflow, $C_{TE}$ enters the trailing edge cooling circuit 60 through an inlet opening 62. The airflow $C_{TE}$ flows through an inlet passage 64 into a feed passage 66, through the feed passage 66 and exits through a trailing edge 68.

The airflow $C_{TE}$ from the inlet passage 64 is directed to a lower portion 66A of the feed passage 66 by a transition 70, which is curved to maintain flow attachment. As such, a portion of the airflow $C_{TE}$ flows unimpeded along the transition 70, providing sufficient airflow to a lower portion 66A of the feed passage 66 before exiting through the trailing edge 68. Notably, the transition 70 extends toward the trailing edge 68.

A remaining portion of the airflow $C_{TE}$ is directed further upward from the lower portion 66A of the feed passage 66 to an upper portion 66B of the feed passage 66 by trips strips 72, which are oriented angularly to improve convective cooling. The remaining portion of the airflow $C_{TE}$, directed by the trips strips 72, flows toward a first barrier 74 including a first plurality of cross-over holes 76, which directs the airflow $C_{TE}$ toward a second barrier 78 including a second plurality of cross-over holes 80.

The airflow $C_{TE}$ flows through the first plurality of cross-holes 76 associated with the first barrier 74 and through the second plurality of cross-over holes 80 associated with the second barrier 78. The second plurality of cross-over holes 80 is sized to reduce air flow and maximize cooling efficiency. Each of the individual cross-over holes within the second plurality of cross-over holes 80 are spaced substantially equidistant from one another along a length L of the second barrier 78.

The airflow $C_{TE}$ exits the second plurality of cross-over holes 80, which direct the airflow $C_{TE}$ toward a plurality of protrusions 82 disposed along the trailing edge 68. The plurality of protrusions 82 direct the airflow $C_{TE}$ to a plurality of pockets 86 disposed along the trailing edge 68, where the airflow $C_{TE2}$ is dispersed by the plurality of pockets 86 and exits through the trailing edge 68.

Figure 6:
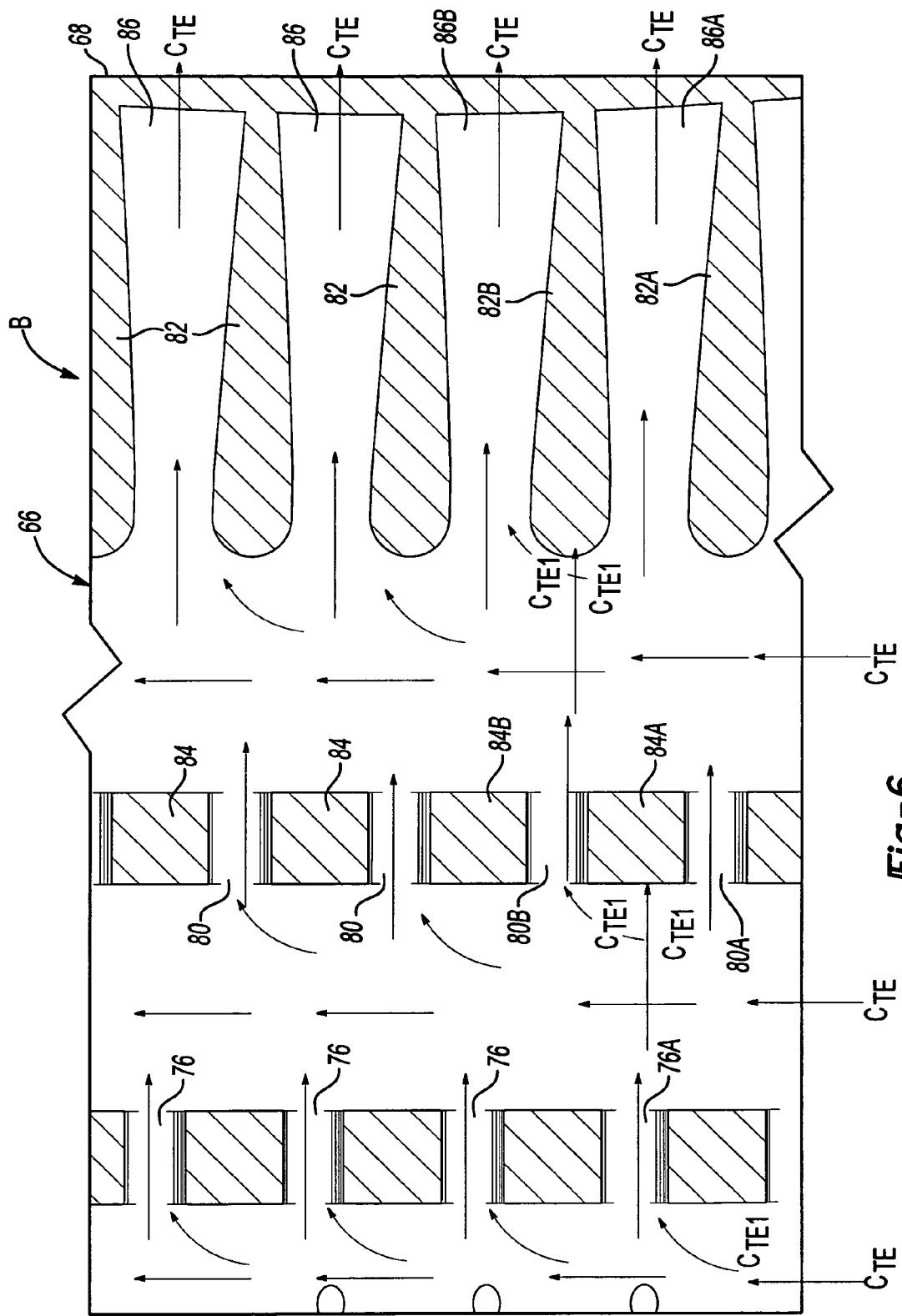
FIG. 6 is a cross-sectional illustration of the feed passage including the trailing edge cooling circuit encircled at B in FIG. 5.

FIG. 6 is cross-sectional illustration of the feed passage 66 of the trailing edge cooling circuit 60 encircled at B in FIG. 5. An airflow $C_{TE}$ flows upward into the feed passage 66 from the inlet passage 64 (FIG. 5). Before exiting the feed passage 66 through the trailing edge 68, a majority of the airflow $C_{TE}$ flows through a first plurality of cross-over holes 76, a second plurality of cross-over holes 80 and around a plurality of protrusions 82.

An offset relationship exists between the first plurality of cross-over holes 76 and the second plurality of cross-over holes 80 such that an example airflow $C_{TE1}$ flowing through a cross-over hole 76A of the first plurality of cross-over holes 76 cannot follow a direct linear path from the cross-over hole 76A through the second plurality of cross-over holes 80. Instead, the example airflow $C_{TE1}$ flows through the cross-over hole 76A, which directs the example airflow $C_{TE1}$ toward a wall portion 84A disposed between a pair of cross-over holes 80A and 80B of the second plurality of cross-over holes 80.

The wall portion 84A redirects the example airflow $C_{TE1}$ upwardly and diagonally to cross-over holes 80A and 80B. The example airflow $C_{TE1}$ then flows linearly from the cross-over hole 80A or 80B toward a protrusion 82A or 82B of the plurality of protrusions 82. The protrusions 82 direct the example airflow $C_{TE1}$ upward around the protrusions 82 and into a pocket 86A, 86B of the plurality of pockets 86 disposed along the trailing edge 68 where the air is dispersed. This sequential redirection of the example airflow $C_{TE1}$ prior to dispersion effectively reduces the velocity of the example airflow $C_{TE1}$.

Figure 7:
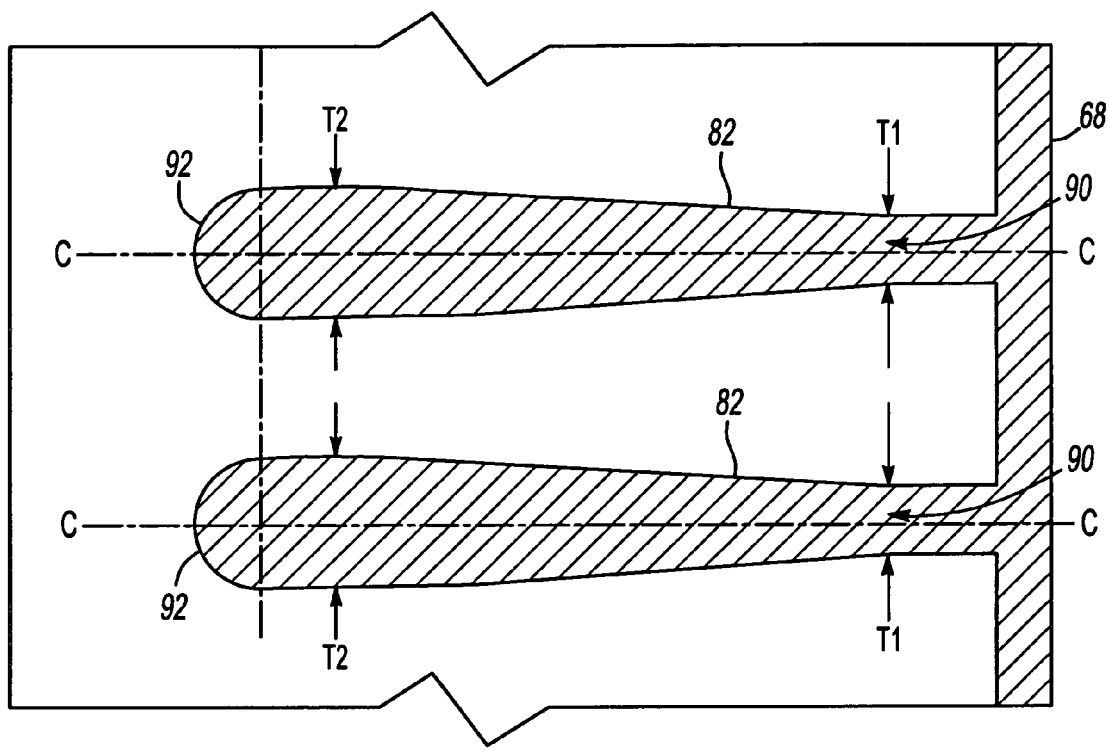
FIG. 7 is a schematic illustration of two protrusions according to one embodiment of the present invention.

FIG. 7 is a schematic illustration of two protrusions 82 according to one embodiment of the present invention. Each protrusion 82 has a first end 90 and a second end 92. The protrusions 82 extend from the first end 90 located near trailing edge 68 to a second end 92 inward away from the trailing edge 68. Each protrusion 82 has a teardrop shape that extends from a first thickness $T_1$ near the first end 90 to a second thickness $T_2$ near the second end 92, which includes a convex surface. An axis C along a length of each of the protrusions 82 is substantially perpendicular to the trailing edge 68.

Figure 8:
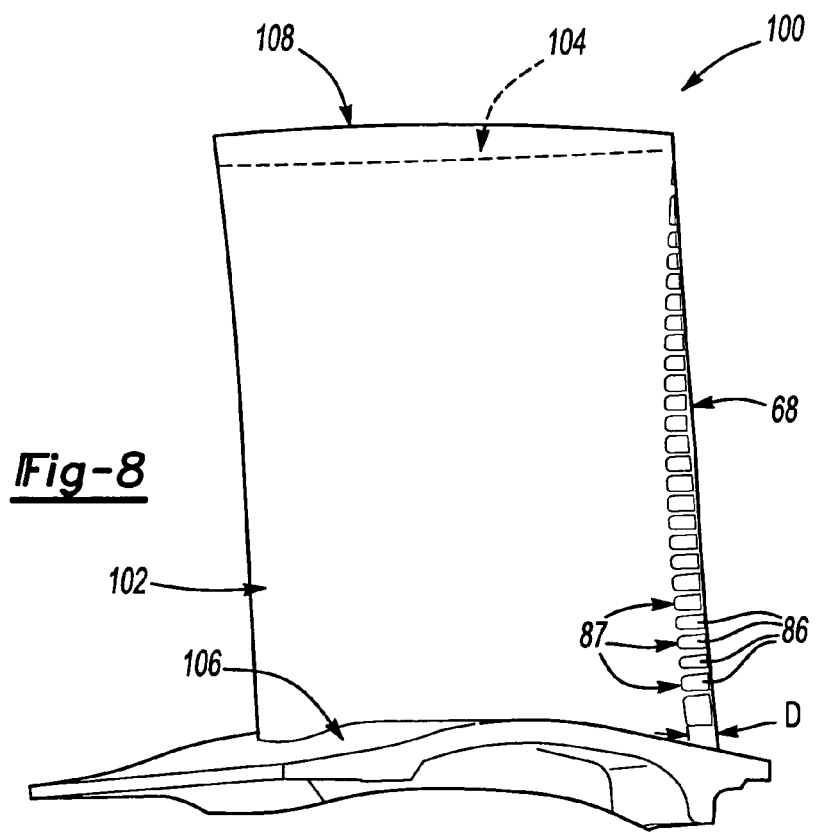
FIG. 8 illustrates an airfoil including a plurality of pockets according to one embodiment of the present invention.

FIG. 8 illustrates an example airfoil 100 according to one embodiment of the present invention including a plurality of pockets 86 disposed along trailing edge 68. The airfoil 100 includes a first surface 102, which is a pressure surface, and a second surface 104, which is a suction surface. The plurality of pockets 86 are disposed along the trailing edge 68 and extend inward from the trailing edge 68 on the first surface 102. The plurality of pockets 86 extend from a bottom edge 106 of the airfoil 100 to a top edge 108 of the airfoil 100. Each of the plurality of pockets 86 include a cutout 87 on the first surface 102, which controls dispersion of an airflow exiting the airfoil 100 from the feed passage (not shown). A depth D of each cutout 87 is a maximum depth in a first pocket 86 located nearest the bottom edge 106 of the airfoil 100 and decreases with each consecutive pocket upward along the trailing edge 68 to a minimum depth in a last pocket 86 nearest to the top edge 108.

Figure 8A:
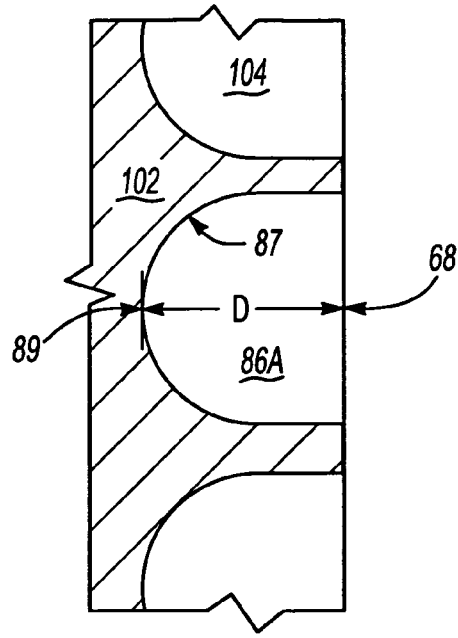
FIG. 8A illustrates a single pocket according to one embodiment of the present invention.

FIG. 8A schematically illustrates a single pocket 86A of the plurality of pockets 86 according to one embodiment of the present invention. The single pocket 86A is formed in the first surface 102. The single pocket 86A includes a cutout 87 in the first surface 102 that has a depth D which extends from the trailing edge 68 to a cutout edge 89 of the cutout 87.

Figure 8B:
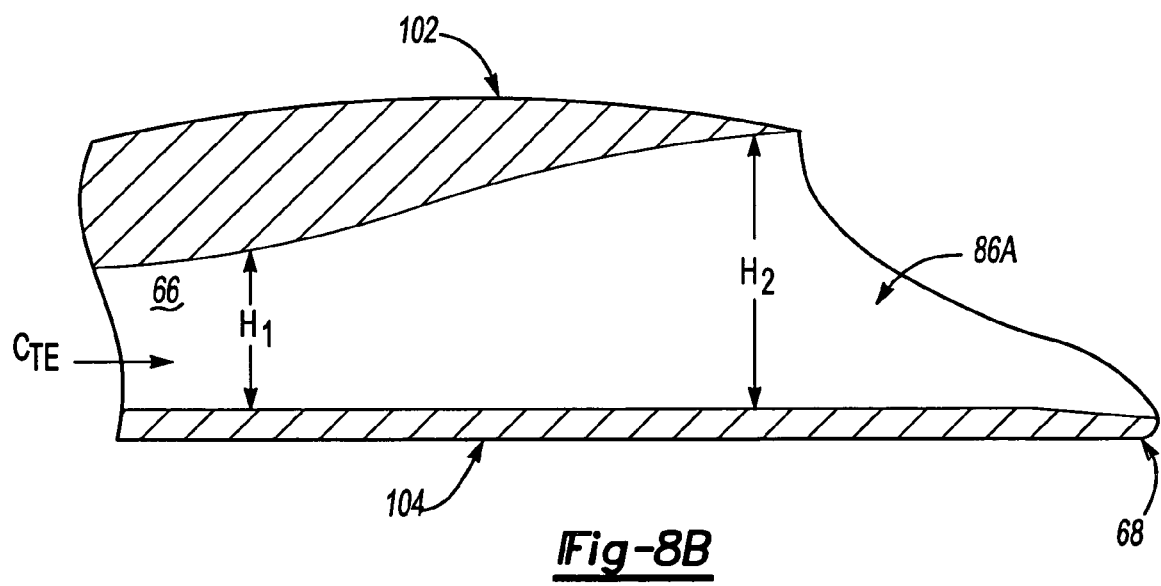
FIG. 8B further illustrates a single pocket according to one embodiment of the present invention.

As illustrated in FIG. 8B, the single pocket 86A has a first height $H_1$ between the first surface 102 and the second surface 104 that is greater than a second height $H_2$ between the first surface 102 and the second surface 104 within a feed passage 66. As an airflow $C_{TE}$ flows from the feed passage 66 and exits through the pocket 86, the change in height from $H_1$ to $H_2$ in conjunction with the change in the depth D along the plurality of pockets 86 as discussed above operates to direct the airflow $C_{TE}$ from the feed passage 66 upward along the trailing edge 68 to maximize cooling efficiency of the airflow along the trailing edge 68.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. An airfoil comprising:
    a body extending from a leading edge to a trailing edge;
    a cooling circuit formed in the body for the trailing edge including:
        an inlet passage;
        a feed passage, wherein the inlet passage and the feed passage are in fluid communication with one another;
        a first barrier including a first plurality of openings disposed along a length of the first barrier; and
        a second barrier including a second plurality of openings disposed along a length of the second barrier, and wherein each of the second plurality of openings are spaced substantially equidistant from each other along a length of the second barrier.

2. The airfoil as recited in claim 1, wherein a width of each opening of the second plurality of openings is common and is in a direction substantially parallel to the trailing edge.

3. The airfoil as recited in claim 1, further including a plurality of protrusions disposed along the trailing edge, wherein each of the plurality of protrusions extends from a first thickness at a first end to a second thickness, greater than the first thickness, at a second end.

4. The airfoil as recited in claim 3, wherein each of the plurality of protrusions extends in a direction substantially perpendicular to the trailing edge.

5. The airfoil as recited in claim 3, wherein the first end is located near the trailing edge.

6. The airfoil as recited in claim 3, wherein the second end is convex.

7. The airfoil as recited in claim 3, wherein at least one opening of the second pluarity of openings coincides with at least one of the plurality of protrusions to direct an airflow from the at least one opening of the second plurality of openings toward the at least one of the plurality of protrusions.

8. The airfoil as recited in claim 3, wherein each individual protrusion of the plurality of protrusions is spaced substantially equidistant from at least one adjacent individual protrusion.

9. The airfoil as recited in claim 1, wherein a plurality of pockets are disposed along a length of the trailing edge and air exits the pockets from the feed passage, wherein a depth associated with an opening of each of the pockets is a first depth near a bottom edge of the airfoil and a second depth, shallower than the first depth, near an top edge of the airfoil.

10. The airfoil as recited in claim 9, wherein the depth of each of the openings associated with each of the plurality of pockets decreases for a bottom pocket having a first depth near a bottom edge of the feed passage and ending with a top pocket having a second depth near a top edge of the feed passage, the first depth being greater than the second depth.

11. The airfoil as recited in claim 1, including an arcuate transition from the inlet passage to the feed passage, the arcuate transition providing an arcuate surface that extends from a first linear surface at an end of the inlet passage and curves past the first and second barriers and transitions into a second linear surface that extends to the trailing edge.

12. The airfoil as recited in claim 11 wherein the first and second linear surfaces are generally perpendicular to each other.

13. An airfoil comprising:
    a body extending from a leading edge to a trailing edge wherein the body has a first surface and a second surface extending between the leading edge and the trailing edge;
    a cooling circuit formed in the body for the trailing edge including:
        an inlet passage;
        a feed passage, wherein the inlet passage and the feed passage are in fluid communication with one another;

at least one partition including a plurality of openings disposed along a length of the at least one partition, wherein a width associated with each of the plurality of openings is common to each of the plurality of openings; and a plurality of pockets are disposed along a length of the trailing edge and air exits the pockets from the feed passage, wherein a depth associated with an opening of each of the pockets is a first depth near a bottom edge of the airfoil and a second depth, shallower than the first depth, near an top edge of the airfoil, and wherein a distance between the first surface and the second surface is a first distance within each of the plurality of pockets and a second distance, smaller than the first distance, within the feed passage.

14. The airfoil as recited in claim 13 wherein the first surface comprises a pressure surface and the second surface comprises a suction surface and wherein each pocket comprises a cutout on the first surface, the cutout at least in part being defined by an arcuate surface.

15. The airfoil as recite din claim 13 wherein the at least one partition comprises a first barrier with a first plurality of holes and a second barrier with a second plurality of holes that are non-coaxial with the first plurality of holes, and including an arcuate transition surface that extends from the inlet passage to the feed passage.

16. An airfoil comprising:
a body extending from a leading edge to a trailing edge;
a cooling circuit formed in the body for the trailing edge including:
an inlet passage;
a feed passage, wherein the inlet passage and the feed passage are in fluid communication with one another;
a first barrier including a first plurality of openings disposed along a length of the first barrier and in fluid communication with the feed passage;
a second barrier including a second plurality of openings disposed along a length of the second barrier and in fluid communication with the first plurality of openings; and
an arcuate transition from the inlet passage to the feed passage wherein the arcuate transition provides an arcuate surface that extends from a first linear surface at an end of the inlet passage and curves past the first and second barriers and transitions into a second linear surface that extends to the trailing edge.

17. The airfoil as recited in claim 16, wherein the transition is located near an inboard edge of the feed passage.

18. The airfoil as recited in claim 16, wherein the transition extends from said inlet passage to said feed passage along an arcuate path towards the trailing edge.

19. The airfoil as recited in claim 16, wherein the first and second linear surfaces are generally perpendicular to each other with the second linear surface initiating at a position that is downstream of outlets of the second plurality of openings.

20. The airfoil as recited in claim 16, wherein the body has a pressure surface and a suction surface extending between the leading edge and the trailing edge, and including a plurality of pockets formed within the pressure surface and disposed along a length of the trailing edge with air exiting the pockets from the feed passage, and wherein a depth associated with an opening of each of the pockets is a first depth near a bottom edge of the airfoil and a second depth, shallower than the first depth, near a top edge of the airfoil, and wherein a distance between the pressure surface and the suction surface is a first distance within each of the plurality of pockets and a second distance, smaller than the first distance, within the feed passage.

21. A method of cooling an airfoil comprising the steps of:
(a) orienting trips strips at an angle within an inlet passage to improve convective cooling;
(b) providing an arcuate transition for a coolant fluid to flow from the inlet passage to a feed passage wherein the arcuate transition provides an arcuate surface that extends from a first linear surface at an end of the inlet passage and curves past first and second transitions and transitions into a second linear surface that extends to a trauma edge;
(c) providing the first partition with first cross-over holes between the inlet passage and the feed passage;
(d) directing the coolant fluid from the inlet passage to the first cross-over holes using the angular trips strips;
(e) directing the coolant fluid from the first cross-over holes toward the second partition that includes second cross-over holes; and
(f) directing the coolant fluid through the second cross-over holes within the second partition to a plurality of protrusions at a trailing edge of the airfoil.

22. The method as recited in claim 21, further including the step of sizing the cross-over holes to maximize a cooling efficiency and reduce the coolant fluid flow.

23. The method as recited in claim 21, further including the step of sizing the plurality of protrusions to maximize diffusion angles, maximize a cooling efficiency and reduce the coolant fluid flow.

24. The method as recited in claim 21, further including the step of providing a plurality of pockets disposed along a trailing edge of the feed passage and including varying a depth associated with each of the plurality of pockets to maximize a cooling efficiency.

25. The method as recited in claim 21, further including the step of forming the first and second linear surfaces to be generally perpendicular to each other with the second linear surface initiating at a position that is downstream of outlets of the second cross-over holes.

* * * * *

UNITED STATES PATENT AND TRADEMARK OFFICE
CERTIFICATE OF CORRECTION

| | |
|---|---|
| PATENT NO. | : 7,452,186 B2 |
| APPLICATION NO. | : 11/205299 |
| DATED | : November 18, 2008 |
| INVENTOR(S) | : Charbonneau et al. |

Page 1 of 1

It is certified that error appears in the above-identified patent and that said Letters Patent is hereby corrected as shown below:

ON THE TITLE PAGE:

item (75) Inventors:

The 10th Inventor should read as follows: --Edward F. Pietraszkiewicz, Southington, CT (US)--

The 11th Inventor should read as follows: --Richard M. Salzillo Jr., Plantsville, CT (US)--

Claim 21, Column 8, line 25: "trauma" should read as --trailing--

Signed and Sealed this

Twenty-seventh Day of January, 2009

JOHN DOLL
*Acting Director of the United States Patent and Trademark Office*